US009116892B2

(12) United States Patent  (10) Patent No.: US 9,116,892 B2
Knight et al.  (45) Date of Patent: Aug. 25, 2015

(54) METHOD FOR IMPROVING THE RESPONSIVENESS OF A CLIENT DEVICE

(75) Inventors: Mark Knight, Surrey (GB); Jaume Vidal, London (GB); Ed Bedwell, London (GB); Duncan Edwards, London (GB); Mark Sullivan, Warwickshire (GB); Michael Lamb, Buckinghamshire (GB)

(73) Assignee: OMNIFONE LIMITED, London (GB)

( * ) Notice: Subject to any disclaimer, the term of this patent is extended or adjusted under 35 U.S.C. 154(b) by 0 days.

(21) Appl. No.: 13/263,384

(22) PCT Filed: Apr. 7, 2010

(86) PCT No.: PCT/GB2010/050602
§ 371 (c)(1),
(2), (4) Date: May 21, 2012

(87) PCT Pub. No.: WO2010/116187
PCT Pub. Date: Oct. 14, 2010

(65) Prior Publication Data
US 2012/0221514 A1   Aug. 30, 2012

(30) Foreign Application Priority Data
Apr. 7, 2009  (GB) .................................. 0906004.7

(51) Int. Cl.
*G06F 17/30* (2006.01)
(52) U.S. Cl.
CPC .......... *G06F 17/30038* (2013.01); *G06F 17/30* (2013.01); *G06F 17/30292* (2013.01)
(58) Field of Classification Search
CPC ......... H04L 67/32; H04L 51/32; H04L 69/40; Y10S 707/99931; Y10S 707/99953; Y10S 707/99942; Y10S 707/99945; G06F 8/24; G06F 17/30392; G06F 17/220612; G06F 9/4428; G06F 17/30259; G06F 17/30607; G06F 17/30056; G06F 17/30292; G06F 17/30038; G06F 17/30; G06Q 30/02; G06Q 20/40; G06Q 30/0601; G06Q 10/0637; G06Q 20/12; G06Q 20/145; G06Q 20/204; G06Q 20/322; G06Q 30/06; G07F 17/32; G07F 17/3244; G07F 17/3262; G07F 17/3227; G07F 17/323; G07F 17/3269; G07F 17/3276; G07F 17/3237; G07F 17/3234; G07F 17/3255; G07F 17/3281; G07F 17/3274
USPC .......... 707/610, E17.005, 608, E17.008, 803, 707/740, E17.046; 709/219, 217, 203, 206, 709/218, 205, 233, 104, 225; 717/151, 176, 717/178; 726/26, 28; 455/556.1, 3.03, 3.04, 455/3.05, 3.06; 705/14.53, 738, 14; 715/738
See application file for complete search history.

(56) References Cited

U.S. PATENT DOCUMENTS 5,355,302 A    10/1994 Martin et al.
6,202,070 B1 *  3/2001 Nguyen et al. ......... 707/999.107
(Continued)

FOREIGN PATENT DOCUMENTS

EP   1942423 A1   7/2008
WO   03/047217 A2   6/2003

OTHER PUBLICATIONS

Jeong-Joon Lee et al.—"An update-risk based approach to TTL estimation in Web caching" Published in: Web Information Systems Engineering, 2002. WISE 2002. Proceedings of the Third International Conference on; Date of Conference: Dec. 12-14, 2002; pp. 21-29—Print ISBN:0-7695-1766-8 INSPEC Accession Number:7627024.*

(Continued)

*Primary Examiner* — Anh Ly
(74) *Attorney, Agent, or Firm* — Saul Ewing LLP

(57) ABSTRACT

A method for improving the responsiveness of a client application by providing that application with a local database which is a replicated subset of a database held on a remote server.

14 Claims, 2 Drawing Sheets

(56) References Cited

U.S. PATENT DOCUMENTS

| | | | |
|---|---|---|---|
| 6,282,711 B1* | 8/2001 | Halpern et al. | 717/175 |
| 6,308,164 B1* | 10/2001 | Nummelin et al. | 705/7.23 |
| 6,324,693 B1 | 11/2001 | Brodersen et al. | |
| 6,629,138 B1* | 9/2003 | Lambert et al. | 709/224 |
| 6,807,558 B1* | 10/2004 | Hassett et al. | 707/E17.109 |
| 7,203,940 B2 | 4/2007 | Barmettler et al. | 717/178 |
| 7,206,805 B1* | 4/2007 | McLaughlin, Jr. | 709/203 |
| 7,403,946 B1* | 7/2008 | Taylor | 707/612 |
| 7,698,297 B2* | 4/2010 | Jawa et al. | 707/713 |
| 8,255,806 B2* | 8/2012 | Halperin et al. | 709/218 |
| 8,478,185 B2* | 7/2013 | Capone et al. | 709/219 |
| 8,688,797 B2* | 4/2014 | Hesselink et al. | 709/217 |
| 8,776,216 B2* | 7/2014 | Boccon-Gibod et al. | 726/21 |
| 2002/0065879 A1* | 5/2002 | Ambrose et al. | 709/203 |
| 2003/0093413 A1 | 5/2003 | Dettinger et al. | |
| 2003/0212697 A1 | 11/2003 | Davis et al. | |
| 2004/0015504 A1* | 1/2004 | Ahad et al. | 707/100 |
| 2005/0086384 A1* | 4/2005 | Ernst | 709/201 |
| 2005/0120082 A1* | 6/2005 | Hesselink et al. | 709/219 |
| 2005/0251533 A1* | 11/2005 | Harken et al. | 707/104.1 |
| 2005/0256834 A1* | 11/2005 | Millington et al. | 707/1 |
| 2006/0031222 A1* | 2/2006 | Hannsmann | 707/10 |
| 2006/0155672 A1* | 7/2006 | Lee et al. | 707/1 |
| 2006/0173974 A1* | 8/2006 | Tang | 709/217 |
| 2006/0212860 A1* | 9/2006 | Benedikt et al. | 717/144 |
| 2007/0100701 A1* | 5/2007 | Boccon-Gibod et al. | 705/21 |
| 2007/0124278 A1* | 5/2007 | Lewis et al. | 707/2 |
| 2007/0136817 A1* | 6/2007 | Nguyen | 726/26 |
| 2007/0198698 A1* | 8/2007 | Boyd et al. | 709/224 |
| 2007/0226678 A1* | 9/2007 | Li et al. | 717/101 |
| 2007/0244987 A1* | 10/2007 | Pedersen et al. | 709/217 |
| 2008/0021866 A1* | 1/2008 | Hinton et al. | 707/2 |
| 2008/0091683 A1* | 4/2008 | Messinger | 707/9 |
| 2008/0109808 A1* | 5/2008 | Wing et al. | 718/102 |
| 2008/0120192 A1* | 5/2008 | Lilly et al. | 705/22 |
| 2008/0250319 A1* | 10/2008 | Lee et al. | 715/716 |
| 2008/0250431 A1* | 10/2008 | Lee et al. | 719/328 |
| 2008/0318550 A1* | 12/2008 | DeAtley | 455/411 |
| 2009/0043881 A1* | 2/2009 | Alstad | 709/224 |
| 2009/0061764 A1* | 3/2009 | Lockhart et al. | 455/3.06 |
| 2009/0063503 A1* | 3/2009 | Ward | 707/10 |
| 2009/0117530 A1* | 5/2009 | Capone et al. | 434/362 |
| 2009/0177704 A1* | 7/2009 | Consul et al. | 707/200 |
| 2009/0196311 A1* | 8/2009 | Khosravy | 370/503 |
| 2010/0070870 A1* | 3/2010 | Halperin et al. | 715/742 |
| 2010/0169639 A1* | 7/2010 | Jeffries et al. | 707/E17.005 |
| 2010/0268742 A1* | 10/2010 | Ring et al. | 707/792 |
| 2010/0278162 A1* | 11/2010 | Groux et al. | 709/223 |
| 2010/0279735 A1* | 11/2010 | Silverbrook et al. | 455/556.1 |
| 2012/0191797 A1* | 7/2012 | Masonis et al. | 709/206 |
| 2012/0278726 A1* | 11/2012 | Halperin et al. | 715/742 |
| 2012/0295243 A1* | 11/2012 | Capone et al. | 709/217 |
| 2013/0151596 A1* | 6/2013 | Strong et al. | 709/206 |

OTHER PUBLICATIONS

Xueyan Tang; and Chanson, S.T.—"The minimal cost distribution tree problem for recursive expiration-based consistency management"—Published in: Parallel and Distributed Systems, IEEE Transactions on (vol. 15, Issue: 3) pp. 214-227; Date of Pub.:Mar. 2004 Date of Current Version :Feb. 19, 2004.*

International Search Report, dated Jul. 22, 2010, issued in priority International Application No. PCT/GB2010/050602.

International Preliminary Report on Patentability, dated Oct. 11, 2011 and Written Opinion, issued in priority International Application No. PCT/GB2010/050602.

* cited by examiner

METHOD FOR IMPROVING THE RESPONSIVENESS OF A CLIENT DEVICE

CROSS REFERENCE TO RELATED APPLICATIONS

This application claims the priority of PCT/GB2010/050602, filed on Apr. 7, 2010, which claims priority to Great Britain Application No. 0906004.7, filed Apr. 7, 2009, the entire contents of which are hereby incorporated in total by reference.

BACKGROUND OF THE INVENTION

1. Field of the Invention

The invention relates to the field of database design and data storage, representation or manipulation. Specifically, it relates to improving the responsiveness of a client application (such as a media player application) and to reducing network latency and/or network traffic.

2. Description of the Related Art

Computing applications operating within a client-server architecture which require access to data from a remote database server are commonplace.

One historical problem, resolved by the present invention, with the said architecture is that such client applications exhibit greater latency (slower response times) due to the need to contact the remote database server for information. In addition, another problem—also solved by the present invention—with the said architecture is that they have historically consumed large quantities of network bandwidth when performing the said communications with the remote database server.

Historically, client applications have attempted to work around those issues by caching (keeping a temporary store of) some or all data supplied by the remote server. However, that technique itself has a number of serious limitations, the most major of which are assorted problems with determining how long data should be cached for.

A further historic problem which is resolved by the present invention is the provision of fresh ("currently active") data to a newly installed client installation. Historically, new client installations request their initial data from the remote server by making large numbers of data requests to the remote database server, resulting in lengthy response times while that data is provided. The present invention solves that problem by providing a mechanism to permit the installation application to download pre-packaged data immediately on installation.

Finally, the "caching" method employed in all prior art results in a further problem, which is that changes to the database structure—such as the inclusion of additional tables or the restructuring of existing database tables—has necessitated that both the client application code and its corresponding local data stores need to be updated, with updates to the data stores causing the loss of some or all previously-cached information, requiring the said data to be downloaded.

In summary, the prior art makes use of data caching, which has problems with latency, program responsiveness and high network traffic and forces the re-downloading of previously-obtained data when a major restructuring of data is required. The methods disclosed by the present invention solve all of those historical problems.

SUMMARY OF THE INVENTION

The present invention discloses a method for improving the responsiveness of a client application by ensuring that the said application has fast/substantially immediate access to current data.

The said access to current data is ensured by providing the client application with a local replication of some or all of the content of the remote database via one or more of the following mechanisms:

- The inclusion within the client application installer of a copy of the required portion of the remote database
- Enabling the client application installer to retrieve a copy of the said required portion of the remote database during the installation process
- Enabling the client application to create and maintain a local database which is synchronized with the data held on the remote server
- Enabling the client application to create and maintain a local database which is synchronized with the structure within which that data is held on the remote server By use of the said mechanisms, the client application's data, both in terms of its content and its structure, may be synchronized with the remote database server while minimizing the network traffic required to do so.

An implementation of the present invention resolves the historical problems described above and relating to how long data should be cached for by replicating a portion of the remote database on the client device while maintaining a record on the remote server of which data is stored on that client device and thereby shifting the burden of determining when that data needs to be refreshed from the client device to the remote server.

An implementation of the invention has the facility to incorporate scripts to restructure a database schema within the update package; this solves the historical problem associated with updating client application code and local data stores by permitting the local database structure to be amended without any concomitant loss of data, and therefore without requiring that previously-obtained data be re-downloaded by the client application.

DEFINITIONS

For convenience, and to avoid needless repetition, the terms "music" and "media content" in this document are to be taken to encompass all "media content" which is in digital form or which it is possible to convert to digital form—including but not limited to books, magazines, newspapers and other periodicals, video in the form of digital video, motion pictures, television shows (as series, as seasons and as individual episodes), computer games and other interactive media, images (photographic or otherwise) and music.

Similarly, the term "track" indicates a specific item of media content, whether that be a song, a television show, an eBook or portion thereof, a computer game or any other discreet item of media content.

The terms "playlist" and "album" are used interchangeably to indicate collections of "tracks" which have been conjoined together such that they may be treated as a single entity for the purposes of analysis or recommendation.

The terms "digital media catalogue", "digital music catalogue", "media catalogue" and "catalogue" are used interchangeably to indicate a collection of tracks and/or albums to which a user may be allowed access for listening purposes.

The abbreviation "DRM" is used to refer to a "Digital Rights Management" system or mechanism used to grant access rights to a digital media file.

The verb "to listen" is to be taken as encompassing any interaction between a human and media content, whether that be listening to audio content, watching video or image content, reading books or other textual content, playing a computer game, interacting with interactive media content or some combination of such activities.

The terms "user", "consumer", "end user" and "individual" are used interchangeably to refer to the person, or group of people, whose media content "listening" preferences are analysed and for whom recommendations are made. In all cases, the masculine includes the feminine and vice versa.

The terms "device" and "media player" are used interchangeably to refer to any computational device which is capable of playing digital media content, including but not limited to MP3 players, television sets, home computer systems, mobile computing devices, games consoles, handheld games consoles, vehicular-based media players or any other applicable device or software media player on such a device.

The "server" is a computing device which operates as a database server.

The "client" device is a computing device and which may be a mobile computing device. The client device may be the same computing device as the server in some configurations.

The "remote database" consists of a collection of data items, however represented, on the server.

The "local database" consists of a collection of data items, however represented, on the client device.

The "network" is a method of communicating between the said server and the said client device using, for example, the internet, a local network or a wireless network.

In the preferred embodiment, the database and data items referred to are structured in a relational database which is accessed, directly or indirectly, using Structured Query Language (SQL) or some equivalently powerful Application Programming Interface (API). In the preferred embodiment, the local database is provided via an embedded C database engine. In another embodiment, the client application utilises an external database, whether external to the client application software or external to the client device entirely.

DETAILED DESCRIPTION

The present invention discloses a method for improving the responsiveness of a client application by ensuring that the said application has fast or substantially immediate access to current data.

Figure 1:
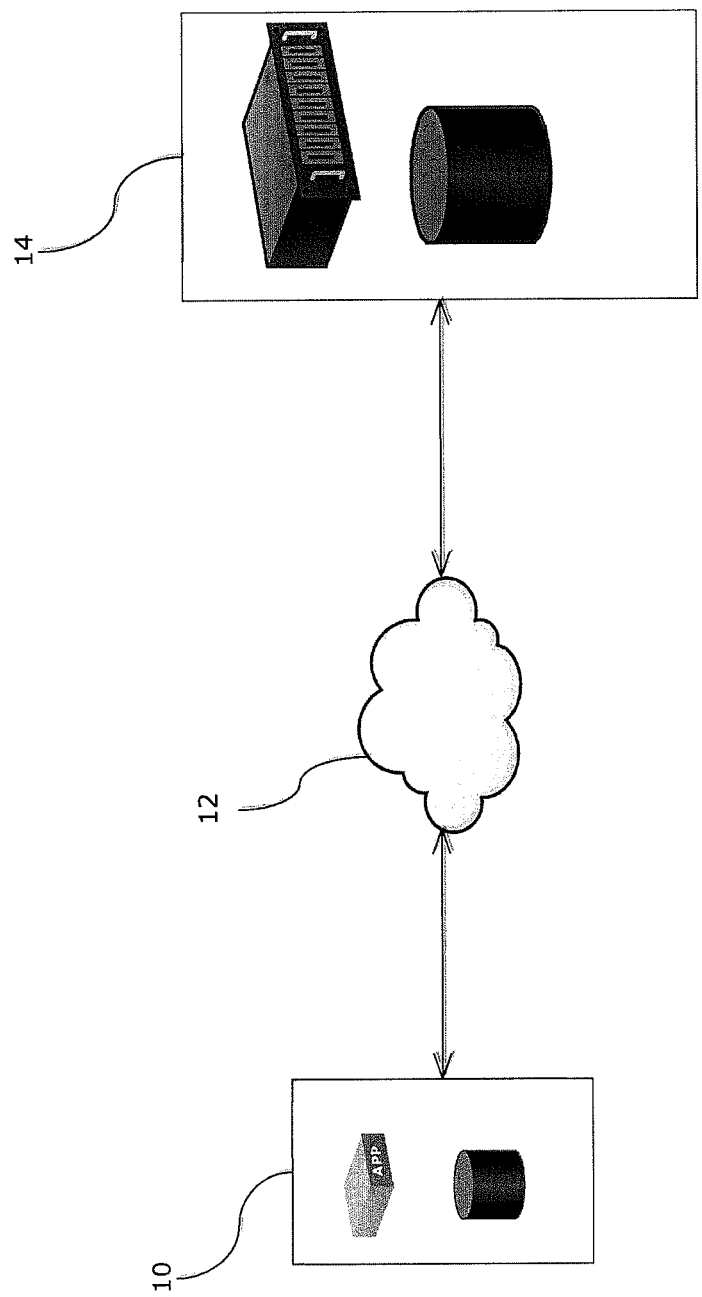
FIG. 1 is a simplified example of a client-server architected application.

The present invention is applicable to any client-server architected application where the client application makes use of data which is maintained on a remote server and where the said data would, in the prior art, be obtained from that server via a network such as the internet, a mobile network, a wireless network or by any other network transport mechanism. FIG. 1 is a simplified example of such architecture, in which a client device 10 includes a client application and a local database for replicating a portion or all of the data maintained in a remote database located on a remote server 14. The client device 10 and remote server 12 communicate via network 12.

Figure 2:
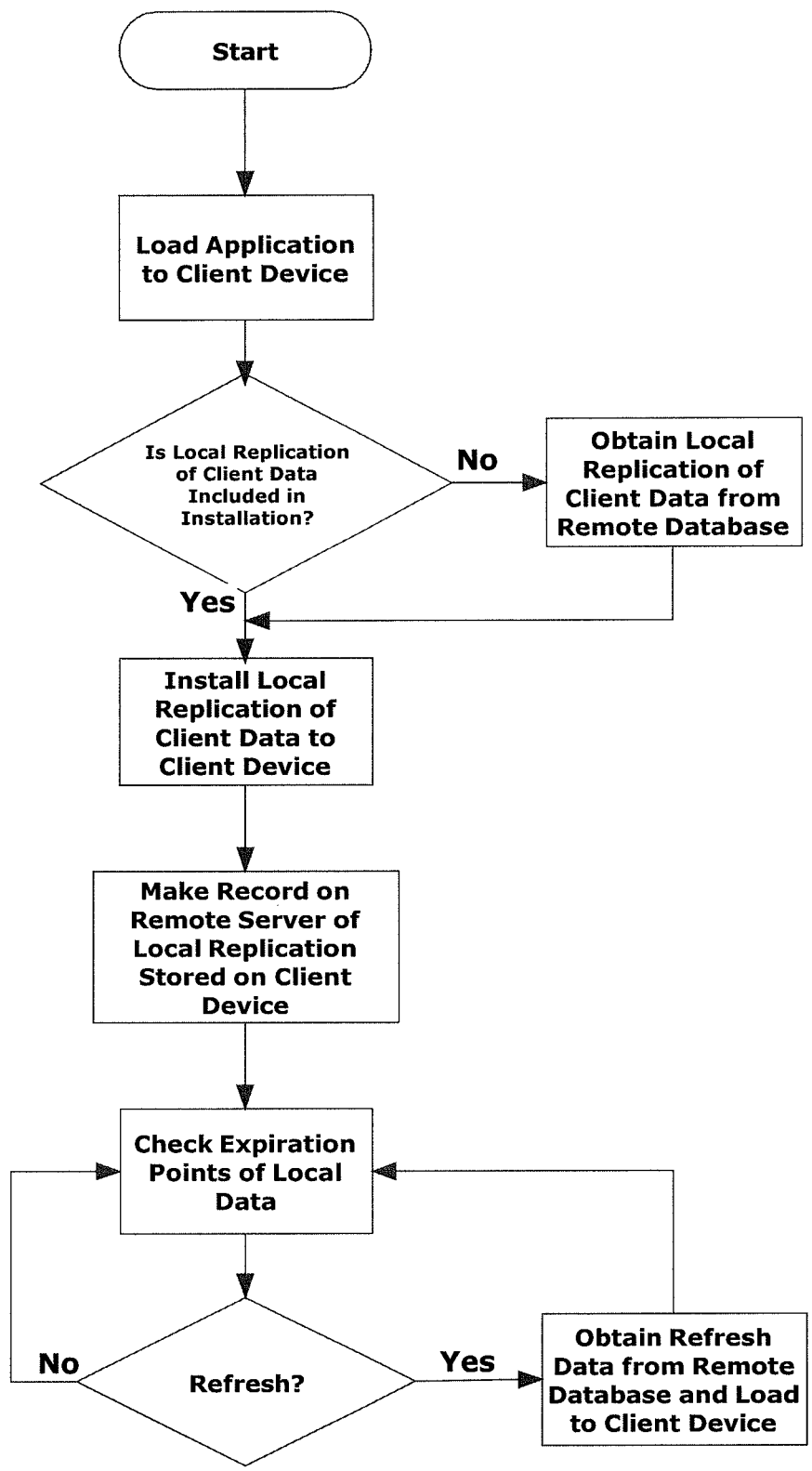
FIG. 2 is a flowchart illustrating the basic steps of the claimed invention.

The said access to current data is ensured by providing the client application with a local replication of some or all of the content of the remote database via one or more of the disclosed mechanisms:

1. The inclusion within the client application installer of a copy of the required portion of the remote database
2. Enabling the client application installer to retrieve a copy of the said required portion of the remote database during the installation process
3. Enabling the client application to create and maintain a local database which is synchronized with the data held on the remote server
4. Maintaining a record on the remote server as to precisely which data is stored on each client installation and using that record to determine when to refresh data on the client installation The present invention requires that the client application makes use of a local database and that the structure and/or content of that local database be a reflection of the content of a remote database. FIG. 2 is a flowchart illustrating the basic steps of the claimed invention, which steps are described in greater detail below.

Data Access

In the preferred embodiment, the client application accesses data via a data access layer which operates like so:

1. If the requested data is available in the local database then that data is provided to the client application.
2. If data in the local database is nearing a defined expiration point, as defined below, or data is requested which is not within the local database then that local database may be refreshed, and in the preferred embodiment is automatically refreshed, by retrieving the current data from the remote server.
3. The said data refresh may be in whole or in part, refreshing the entire local database or just some defined portion of it such as requested data which is not currently stored in the local database, or that portion of the local database which is nearing expiry or any other portion of the local database In the preferred embodiment, the data access layer is instantiated via a defined API which is accessible by the client application whereby the client application may remain agnostic as to the location from which the requested data is retrieved. In another example embodiment, the said data access layer and its associated data retrieval logic is included within the client application code.

In the preferred embodiment, where locally stored data is available but "stale" then that data is provided to the client application in the first instance, but is refreshed as soon as possible and the client application is written such that it re-checks its data by polling the data access layer periodically. For example, a "top 10" list of most popular media items would be displayed using the available data and the data access layer polled for more current data periodically, with the client application refreshing the display whenever the data provided by the data access layer is updated.

The client media player employs local caching of data in the database, as is the case with the preferred embodiment described herein of the MusicStation desktop client. The local database caches all or part of the contents of the remote database, and synchronises with that remote database as described below.

Data Expiration and Updates

Data stored within the local database is, in the preferred embodiment, marked with expiration metadata to any required granularity.

The said expiration metadata may be assigned at the level of the entire local database (setting a point at which the local database is to expire in its entirety); against collections of records, such as database tables or sets of data such as those disclosed in PCT/GB2010/050594 against individual records within the database; or against individual fields within records.

In the preferred embodiment, the said expiration point is defined temporally, by duration since that data was last refreshed or by defining a specific date/time at which that data expires. In another example embodiment, the said expiration point is defined in relation to other data records, whereby data in record X expires when the data in record Y changes. In still another example embodiment, the entire local database content is refreshed at regular pre-defined intervals.

When a particular data item nears, reaches or passes its expiration point then that data may be regarded as being "stale" and may be refreshed by comparing the local data to that on the remote server.

In the preferred embodiment, the remote server maintains a record of which data is stored in the local database for each client application installation. The expiration points for data in the said server record are checked periodically and, where "stale" data is identified on a particular client installation then the server, in the preferred embodiment, automatically sends updates to the said client installation.

Providing the Client Installer with Fresh Data

The following mechanisms are disclosed to provide the client installer with current ("fresh") data, thereby reducing latency and network traffic.

In the first example embodiment, the installer for the client application is created so as to contain one or more packages of data which, taken as a whole, incorporate the current data which is to be initially stored in the local database.

In a second example embodiment, the installer for the client application contains one or more packages of data which, taken as a whole, incorporates the said current data wherein some or all of the said current data is marked as expiring immediately, thereby forcing a refresh of the client application's local database on first use.

In the third, and preferred, embodiment, the client installer is, in contrast with all prior art in the field, provided with a database download function which may be utilized to obtain the current data from the server and use that data to create and/or populate the local database for use by the client application.

Data Provided to the Client Installer

The data provided to the client installer using one or more of the methods disclosed above consists of:
  A database which is pre-prepared as being valid for installations performed at the time of installation
  All customer-dependent data The said customer-dependent data consists of data which is specific to the particular individual who is installing the client application. In the case of a digital media application, such information might include customer playback, preference and/or recommendations metadata. In the case of an application with social networking or community functionality, such information might include the customer's profile, friends lists and messages. Any customer-specific data may be included in this category, as required by the client application and/or the type of service involved.

The said pre-prepared database consist of data which is regarded as being useful as the time of installation. That data is prepared and periodically refreshed (monthly, weekly, daily or at some other period) to contain data which is defined as being useful to users of the client application (and/or the service of which it forms a part) at the time that the client application is installed.

The precise content of the said pre-prepared database will vary according to the type of client application and/or service.

In the preferred embodiment, the said database includes the contents of several defined sets of data (data sets and their usage are disclosed in PCT/GB2010/050594 such as the current music charts in the locale in which the client installation is taking place and the most popular and most recently released music tracks in the said locale.

In the preferred embodiment, the database content, however provided, is supplied to the client application and/or its installer in the form of a .sdf file.

Auto-Sync and Display

A specified set of data may be set to expire immediately when the Local Database is generated. This is to ensure that when a user installs the client application they are seeing their current data.

Without setting the expiry time, the client will show the data for the customer used in generating the pre-loaded database for a day (or some other defined time period) before it shows the customer's true data. This situation is most serious when a customer who has been using a given client application on the service for a while then installs another client application for use with the same service, since they will not see any of their own data for a day and it will be very clear that they are not seeing live data.

To provide this functionality, and so solve the problem alluded to above, the real database download function is, in contrast to all prior art, made available to the installer.

This:
  Takes a database which is pre-prepared for that week/day
  Loads all customer dependent data
  Downloads a database .sdf file to installer. Once this is done this data is immediately accessible.
  Mark a pre-defined collection of data to expire immediately, in order to ensure that the said collection of data is refreshed as soon as possible Local Database Replication The following mechanisms are disclosed for managing the data items on the client and server such that the local database contains or comprises a subset of the content of the remote database. In the preferred embodiment, the local database is capable of being updated using any one of the following methods, or by any combination thereof:
  Data from the remote database is communicated to the client device, where it is stored in toto or in part, for use by the client application.
  Data updated on the client is automatically synchronised back to the remote server. Similarly, any data updated on the server is automatically synchronised back to the client, for storage in its local cache sub-set of the remote database.
  The server retains information concerning what specific data is stored on each client application, in order to ensure that that data is kept in sync with the server's database
  The server automatically, in the preferred embodiment, pushes any server-side changes to the client at the earliest opportunity, where the earliest opportunity is itself dependent on configuration and device and network capabilities and availability.

The amount and size of data stored on a given client device is dependent on that device platform's capabilities and on the user's preferences for that device.

Remote Update of Database Structure

When upgrading the capabilities of a client application, the related local database structure may also be modified to automatically bring it into line with a structure preferred by that software update and to ensure that any locally stored data is stored appropriately in the new database structure.

This is implemented, in the preferred embodiment, by providing a migration script, to perform the update, alongside the basic software update, and so removing the need—required in prior art—for redownloading data from the server where that data is capable of being restructured on the client device during the update process.

In this manner, the present invention provides the ability to remotely synchronise both the structure and the data of that portion of the remote database which is cached locally on the client device.

The invention claimed is:

1. A method for improving responsiveness of a client media player application executable on a client device, by providing the client media player application with a local relational database which is a replicated subset of a database held on a remote server, wherein data items in the local relational database have associated expiration points and wherein expired data items are refreshed with data from the remote server, the method comprising the steps of:
   (i) providing the client media player application running on the client device with the local relational database, wherein the local relational database is a replicated subset of the database held on the remote server, wherein the local relational database is embodied on a non-transient storage medium, and wherein the client media player application is embodied on a non-transient storage medium,
   (ii) identifying expired data items in the local relational database,
   (iii) obtaining data from the remote server to refresh the expired data items, and
   (iv) refreshing identified expired data items with the data obtained from the remote server.

2. The method of claim 1 wherein the local relational database is supplied pre-packaged with a client application installer.

3. The method of claim 1 wherein a client application installer downloads a pre-prepared local relational database from the remote server.

4. The method of claim 1 wherein the remote server maintains a record of which data is stored on each client installation along with expiration metadata for that data, the method including the step of: the remote server updating the record of which data is stored on each client installation along with expiration metadata for that data each time data is downloaded from the remote server to the local relational database.

5. The method of claim 4 wherein the remote server pushes refreshed data to the local relational database when the local relational database data items are near, at or beyond their expiration point defined in the expiration metadata.

6. The method of claim 5 wherein the push of refreshed data from the remote server to the local relational database happens automatically.

7. The method of claim 5 wherein the push of refreshed data from the remote server to the local relational database also updates a structure of the local relational database and relocates existing and new data into the updated structure.

8. The method of claim 1 wherein the client application is installed on a computing device wherein the computing device is a desktop computer, a laptop computer, a mobile device, a games console or any other computing device.

9. The method of claim 1 wherein a client installer performs an update to one or more of the client application, local relational database content or local relational database structure.

10. The method of claim 1 wherein the client application causes the client device to function as a media player.

11. The client device of claim 1, wherein the client device includes the client media player application running on the client device, and wherein the client device includes the local relational database.

12. The method of claim 1, further comprising the step of: synchronizing the local relational database with the database held on the remote server.

13. The method of claim 1, further comprising the step of: incorporating scripts to restructure a local database schema within an update package.

14. A non-transient storage medium embodying the client media player application and the local relational database of claim 1.

* * * * *